United States Patent [19]

Stubbings

[11] 4,069,583
[45] Jan. 24, 1978

[54] SHEET METAL CUTTING

[75] Inventor: James Henry Stubbings, Rockville, Md.

[73] Assignee: Potomac Applied Mechanics, Inc., Bethesda, Md.

[21] Appl. No.: 721,590

[22] Filed: Sept. 8, 1976

Related U.S. Application Data

[62] Division of Ser. No. 630,894, Nov. 11, 1975.

[51] Int. Cl.² ............................................. B26B 15/00
[52] U.S. Cl. .................................... 30/228; 30/241; 83/559; 83/694; 83/825
[58] Field of Search ................. 83/559, 597, 600, 609, 83/825, 694; 30/228, 241

[56] References Cited

U.S. PATENT DOCUMENTS

| 879,900 | 2/1908 | Potstada | 30/241 |
| 2,318,982 | 5/1943 | Wilhide | 30/228 |
| 2,750,667 | 6/1956 | Johnson | 30/241 X |
| 2,822,871 | 2/1958 | Malek | 30/228 |
| 2,888,744 | 6/1959 | Yermish | 30/228 |
| 3,710,445 | 1/1973 | Roth | 30/228 X |

Primary Examiner—Willie G. Abercrombie
Attorney, Agent, or Firm—Cushman, Darby & Cushman

[57] ABSTRACT

A shearing cutting tool that may be either hand or machine operated. The tool includes an upper blade, a lower blade, a device for moving at least one of the blades with respect to the other blade, an arm mounting the lower blade below a sheet of material to be cut, and a ball bearing mounted on the arm. The ball bearing has a portion thereof extending upwardly from the arm, and is mounted adjacent the trailing edge of the lower blade for engaging the bottom surface of a sheet to be cut. The ball bearing allows easier pivoting of the cutting tool during cutting to change the direction of cutting.

3 Claims, 4 Drawing Figures

140
SHEET METAL CUTTING

This is a division, of application Ser. No. 630,894 filed Nov. 11, 1975.

BACKGROUND AND SUMMARY OF THE INVENTION

The invention relates to a cutting tool that facilitates direction-changing during cutting therewith to form complicated cut pieces from sheet material. This is especially useful when the cutter is automatically moved during cutting (no close operator control being provided) to prevent binding of the tool in the material being cut (especially sheet metal) when turns at sharp angles are being made. While there are numerous types of cutters, both hand and automatic, in the prior art, such as shown in U.S. Pat. Nos. 2,750,667 and 3,710,445, it is believed that none of such cutters provided for the easy direction-changing cutting movement according to the cutter of the present invention.

The cutting tool according to the present invention comprises an upper blade adapted to be disposed above the surface of a horizontally disposed metal sheet to be cut, a lower blade adapted to be disposed below the surface of a horizontally disposed metal sheet to be cut, and having a leading and trailing edge, and means for moving at least one of the blades with respect to the other blade to effect cutting of the metal sheet. An arm mounts the lower blade in position below the sheet, and a ball bearing is mounted on the arm, and has a portion thereof extending upwardly from the arm, said ball bearing being mounted adjacent the trailing edge of the lower blade and for engaging the bottom surface of the metal sheet to allow easier pivoting of the cutting tool during cutting to change the direction of cutting. Preferably the ball bearing is spring-biased into engagement with the bottom of the metal sheet, and the lower blade is relatively stationary, the upper blade being movable with respect thereto. Also, the arm is preferably a lever pivotal about a generally horizontal axis during horizontal cutting at a pivot point, the ball bearing being mounted adjacent the pivot point on one side thereof and the trailing edge of the lower blade being mounted adjacent the pivot on the other side thereof opposite the side said ball bearing is disposed.

It is the primary object of the present invention to provide an improved cutting tool for cutting sharp angles and curvatures in sheet metal. This and other objects of the invention will become clear from an inspection of the detailed description of the invention, and from the appended claims.

DETAILED DESCRIPTION OF THE INVENTION

Figure 1:
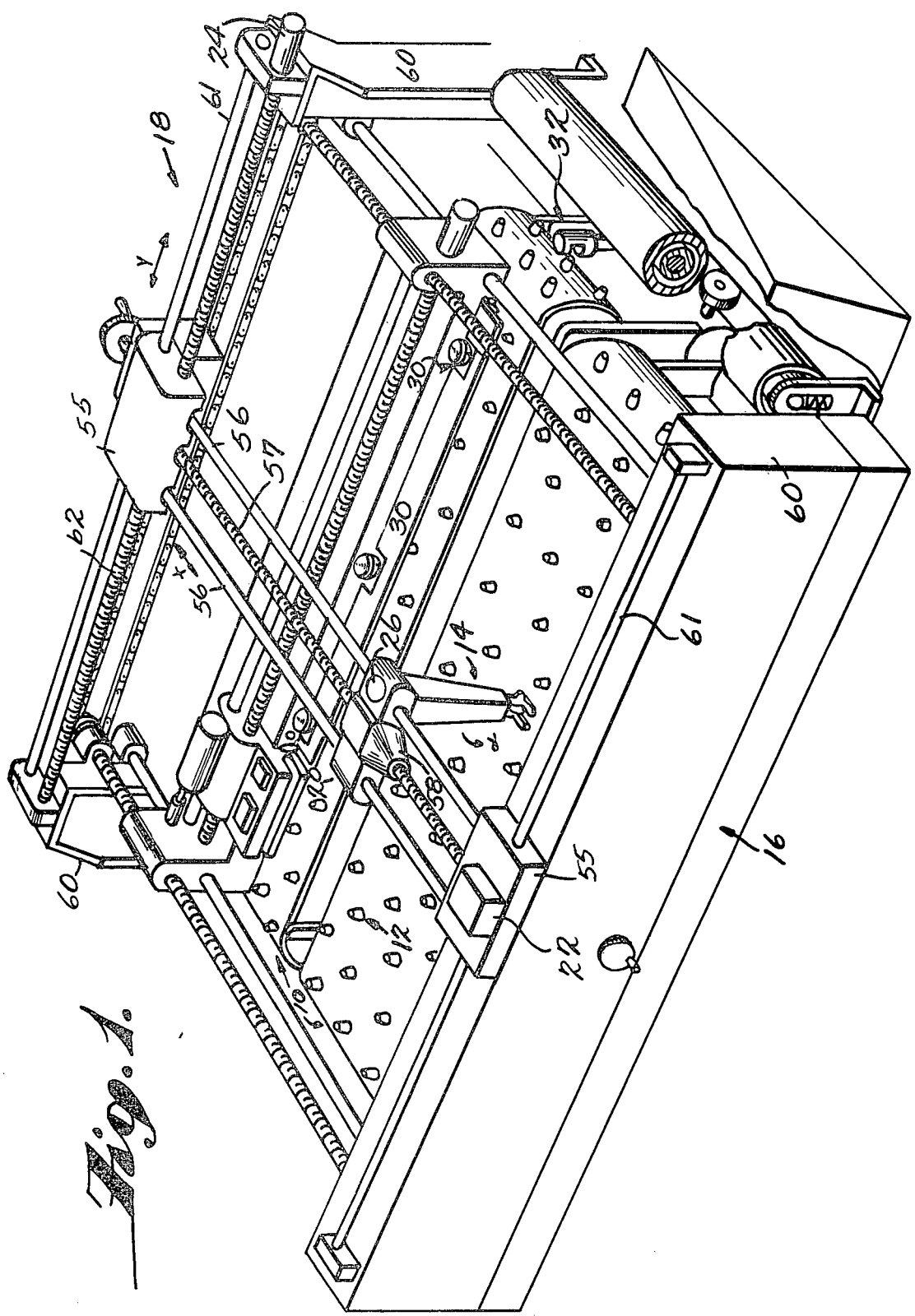

An exemplary automatic sheet metal cutter utilizing the sheet metal cutting tool according to the present invention is shown in FIG. 1. The apparatus according to the present invention includes the major components of a conveying means 10 for conveying a sheet of metal to be pattern cut into a pattern cutting position (see FIG. 7), the conveying means 10 having supporting means 12 associated therewith for supporting the sheet of metal thereon in a manner to prevent damage to the conveying means during pattern cutting of the sheet of metal, a scissors cutting tool means 14 for shearing the sheet of metal to pattern cut it, means 16, 18 for supporting the cutting tool means 14 above the sheet of metal to be pattern cut so that the cutting tool means 14 is in operative cutting position with the sheet of metal, and so that the cutting tool means 14 may be moved in $x$ and $y$ horizontal directions substantially perpendicular to each other, means 20 for supporting the cutting tool means for substantial 360° angular — $\alpha$ — movement about a vertical axis $z$, an $x$ motor 22, a $y$ motor 24, and a $\alpha$ motor 26 for automatically moving the cutting tool means 14 in the $x$, $y$, and $\alpha$ directions, respectively, computer control means 28 (see FIG. 6) for automatically controlling the operation of the $x$, $y$ and $\alpha$ motors 22, 24, and 26, respectively, for moving the cutting tool means 14 to cut a desired preprogrammed pattern from the metal sheet, guide means 30 for guiding the movement of the sheet into pattern cutting position, and clamping means shown generally at 32 and 34, for holding the sheet of metal stationary at its pattern cutting position during pattern cutting thereof. Each of the individual components of the sheet metal cutter may take a number of forms to accomplish pattern cutting of the sheet metal, the following specific embodiments thereof merely being preferred.

Figures 2A, 2B, 2C:
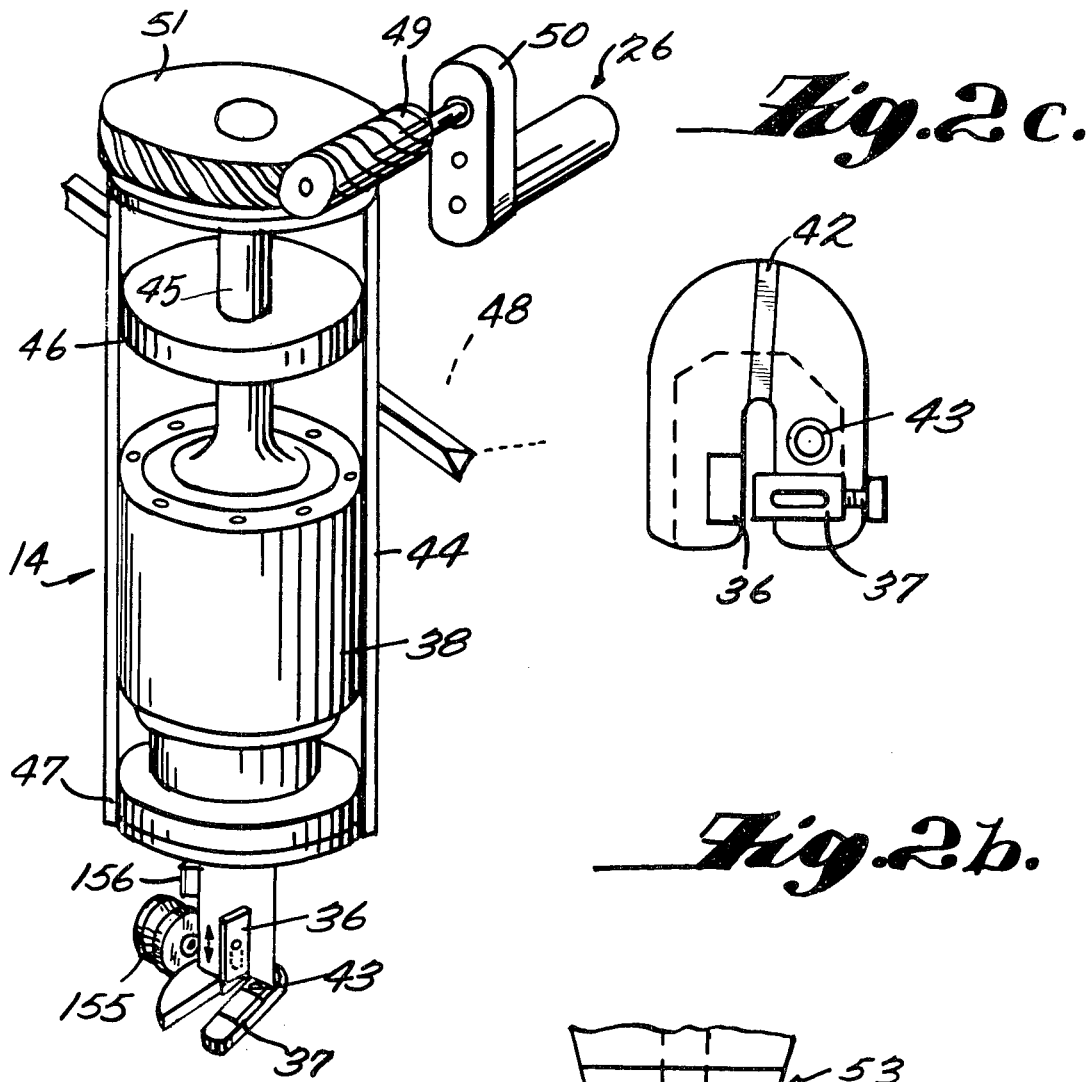

The cutting tool means 14 is shown in more detail in FIGS. 2a–2c. The actual cutting portion of the means 14 includes a pair of blade members 36, 37 for shearing of the metal sheet received therebetween, one blade member 36 being disposed above a horizontally arranged piece of sheet metal to be cut and shearing the metal by penetrating through the top surface thereof, and the other blade member 37 being disposed below the horizontally arranged piece of sheet metal and shearing the metal by penetrating through the bottom surface thereof. The exact structure of the cutting portions may be varied — for instance only one of the blade members 36, 37 may be moved during cutting, or both may be moved during cutting — however one exemplary cutter that may be adapted for use in the present invention is sold under the name Unishear and is manufactured by Stanley, and another is manufactured by Black and Decker (i.e. Stanley model 90 218 (U218) and Black and Decker model 3210). A motor 38 powers the movement of the blade 36 during cutting, and in the embodiment shown in the drawings moves upper blade member 36 downwardly (see the arrows in FIG. 2a which indicate the reciprocating movement) while blade 37 remains stationary. An arm 39 mounts blade member 37, the arm 39 having a leading portion 39' thereof, and a generally flat upper surface for engaging the bottom of the sheet. A stationary guide member 41 which allows reciprocation of blade 36 therein and mounts arm 39, has a V-notch formed in the front end thereof, being so shaped to facilitate movement of the sheet metal to be cut into position between the blades 36, 37. The member 41 has only a thin vertical portion 42 connecting the enlarged upper and lower portions thereof which are adapted to be disposed above and below the sheet of metal to be cut, the portion 42 being adapted to pass through the cut made in the metal sheet by the cutting blades 36, 37. According to an important aspect of the present invention, a ball bearing 43 (which may be spring-mounted, as by spring 43' shown schematically in dotted line in FIG. 2b) is provided on arm 39 adjacent the trailing edge of blade 37 for engaging the bottom surface of the sheet of metal to be pattern cut to facilitate powered movement of the cutting portion through the sheet metal. This is especially important wherein sharp turns are necessary during pattern cutting, especially since the cutting operation is automatic. The ball bearing provides a point of engagement on the metal sheet to allow for sharp rotation of the cutting tool means 14 about the vertical axis z. It is noted that the ball bearing arrangement may be provided on any cutter, a hand automatic cutter, or an automatic cutter such as according to the present invention as illustrated in FIG. 1. It is also noted that the arm 39 could be made as a lever, pivotal about a horizontal axis through a pivot point, and the motor 38 could both reciprocate blade 36 and pivot lever 39, resulting in a simultaneous movement of the blades toward each other during cutting. The ball bearing 43, in such a case, would be disposed adjacent the pivot on the opposite side thereof as blade 37.

The motor 38 of the cutting tool means 14 is mounted within a housing 44 on a shaft 45, a bearing 46 being provided on the top of the motor 38 for receiving shaft 45, and a bearing 47 being provided on the bottom of the motor 38 for receiving shaft 45, the shaft 45 being directly connected to stationary member 41 mounting the blade members 36, 37. The housing 44 is stationarily mounted on a cross-member 48 which is part of mounting means 20, as by keys 48', which cross-member 48 also mounts the α motor 26 for rotating the cutting tool means in the α direction. Although any suitable arrangement may be utilized, it is desired that the stepping α motor 26 turn a worm 49 through a gear box 50, which worm 49 in turn rotates gear 51 attached to the top of the shaft 45, the gear 51 and shaft 45 being rotatable about the z axis. Signals to α motor 26 during the pattern cutting operation will cause rotation of the shaft 45 to position the cutting blades 36, 37 in the correct position for cutting of the desired preprogrammed pattern.

The cutting means 14 is mounted by mounting means 16 and 18 for movement to any particular coordinate of the area covered thereby. The mounting means 16 includes a pair of end members 55 defining the outer extremities of movement in the x-direction, the members 55 being connected by one or more guide rods 56 and a screw-rod 57 or the like. A threaded member 58 of mounting means 20 receives the screw-rod 57 therein and transforms the rotational movement of the screw-rod 57 to linear movement of the mounting means 20 for cutting tool 14, which linear movement is guided by the smooth guide rod(s) 56. x stepping motor 22 is mounted on one of the end members 55, and rotates the screw-rod 57 in response to controls from computer 28.

The mounting means 18 includes a pair of frame members 60 disposed on either end of each end member 55 of the mounting means 16, each pair of frame members 60 having one or more guide rods 61 disposed therebetween as well as a screw-rod 62 disposed between one pair (or both pairs) of frame members 60. The end members 55 of the mounting means 16 receive the guide rod(s) 61 therein, and one of the members 55 has a threaded portion receiving the screw-rod 62 to transform rotational movement of the screw-rod 62 into translational movement of the members 55 in the y direction. The y stepping motor 24 is mounted on one end of the frame members 60 for rotating screw-rod 62, and rotates 62 in response to signals fed to it by computer 28. It is noted that each of the pairs of the frame members 60 must be spaced far enough apart (in the x-direction) so that the scissors blades 36, 37 of the cutting tool can initially engage a side edge of the metal sheet to be cut in order to begin cutting thereof. Alternatively, the bottoms of the frame members 60 could be located relatively close to the proposed edges of the largest sheet of metal to be received by the whole assembly, and the top portions of the frames 60 could then be flared out a large enough distance to allow movement of the cutter tool 14 into proper starting position.

While the mounting means have been described with reference to screw-rods for providing movement of the members 55 and 20 thereof, of course other means could be provided, such as a rack and pinion arrangement or the like.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A sheet metal cutting tool comprising
an upper blade adapted to be disposed above the surface of a horizontally disposed metal sheet to be cut,
a lower blade adapted to be disposed below the surface of a horizontally disposed metal sheet to be cut, and having leading and trailing edges,
means for moving at least one of said blades with respect to the other blade to effect cutting of said metal sheet,
an arm mounting said lower blade in position below said sheet, and
a ball bearing mounted on said arm and having a portion thereof extending upwardly from said arm, said ball bearing being mounted adjacent the trailing edge of said lower blade and for engaging the bottom surface of said metal sheet to allow easier pivoting of said cutting tool during cutting to change the direction of cutting.

2. A sheet metal cutting tool as recited in claim 1 wherein said ball bearing is spring-biased into engagement with the bottom surface of said metal sheet.

3. A tool as recited in claim 2 wherein said arm is relatively stationary and wherein said upper blade is reciprocated with respect to said lower blade.

* * * * *